United States Patent [19]
Knecht et al.

[11] Patent Number: 5,940,462
[45] Date of Patent: Aug. 17, 1999

[54] METHOD FOR PACKAGING CONTROL AND ABSORBER ELEMENTS OF LIGHT-WATER REACTORS FOR WASTE DISPOSAL

[75] Inventors: Klaus Knecht, Erlangen; Rainer Keppler, Poxdorf, both of Germany

[73] Assignee: Siemens Aktiengesellschaft, Germany

[21] Appl. No.: 09/005,700

[22] Filed: Jan. 12, 1998

[30] Foreign Application Priority Data

Jan. 10, 1997 [DE] Germany .......................... 197 00 651

[51] Int. Cl.$^6$ .............................. G21C 19/00; G21F 9/36
[52] U.S. Cl. ........................................... 376/260; 376/272
[58] Field of Search .................................... 376/260, 262, 376/272; 250/506.1, 507.1

[56] References Cited

U.S. PATENT DOCUMENTS

| | | | |
|---|---|---|---|
| 4,343,793 | 8/1982 | Klumb et al. .......................... | 376/260 |
| 4,434,092 | 2/1984 | Mary ...................................... | 376/272 |
| 4,507,840 | 4/1985 | Steinert et al. ......................... | 376/272 |
| 4,643,845 | 2/1987 | Omote et al. ........................... | 376/272 |
| 4,650,606 | 3/1987 | Yamamoto .............................. | 376/272 |
| 5,055,236 | 10/1991 | Krieg ...................................... | 376/260 |
| 5,173,249 | 12/1992 | Merkovsky ............................. | 376/260 |
| 5,227,123 | 7/1993 | Baversten ............................... | 376/260 |

*Primary Examiner*—Daniel D. Wasil
*Attorney, Agent, or Firm*—Herbert L. Lerner; Laurence A. Greenberg

[57] ABSTRACT

A method for packaging, compacting or storing spent control and absorber elements of light-water reactors for waste disposal, a device for preparing an elongated component of a spent control element, a light-water-cooled reactor and a coil of an originally elongated component are provided for storing absorber fingers or absorber sheets of spent control elements in storage containers in pressurized-water reactors or boiling-water reactors. The absorber fingers or absorber sheets are separated from the control elements. They are not cut into pieces (in which process large amounts of radioactive substances would be released), but instead they are only deformed, namely wound into coils which can be stacked in a space-saving manner in the storage containers.

7 Claims, 3 Drawing Sheets

METHOD FOR PACKAGING CONTROL AND ABSORBER ELEMENTS OF LIGHT-WATER REACTORS FOR WASTE DISPOSAL

BACKGROUND OF THE INVENTION

FIELD OF THE INVENTION

The invention relates to a method for compacting or packaging control elements including elongated components in which spent absorber material is gas-tightly enclosed, and for packaging them for subsequent waste disposal in storage containers, in a light-water-cooled nuclear reactor. The invention furthermore relates to a device for performing the method and to appropriately machined components containing the absorber material.

In light-water reactors (boiling-water and pressurized-water reactors), control elements are used for regulating reactor power. Absorber elements are likewise used in primary cores of pressurized-water reactors to compensate for excess capacity.

The existing standard absorber elements contain neutron absorber material (such as $B_4C$ in tablet or powdered form or AgInCd rods) which is contained in gas-tightly sealed tubes attached to a head piece.

The components and materials of both cruciformly constructed control elements containing absorber sheets of boiling-water reactors and spider-shaped control elements of pressurized-water reactors, are subjected during their operation to various loadings which may limit the residence time of the control elements to less than the operating time of a reactor.

The core components which are removed from operation are highly active and contain (depending on the absorber material being used) radioactive decay products formed by neutron capture, for example tritium ($H_3$) as well. The above-mentioned coil components must be removed after being taken out of service from a fuel-element pond which is used for intermediate storage.

Heretofore such core components were cut up under water and the parts were sorted and transferred to standard shielded containers. The method which was used in that case assumed basically that activity was released from the coil components during the dismemberment. The released activity had to be absorbed. The cut-up parts were sorted under water in a time-consuming manner and transferred to the shielded containers. The degree of filling of the screened containers that were filled in such a way was not optimal in the case of that procedure.

SUMMARY OF THE INVENTION

It is accordingly an object of the invention to provide a method for packaging, compacting or storing spent control and absorber elements of light-water reactors for waste disposal, a device for preparing an elongated component of a spent control element, a light-water-cooled reactor and a coil of an originally elongated component, which overcome the hereinafore-mentioned disadvantages of the heretofore-known methods and devices of this general type and which enable an efficient utilization of storage containers for storing components of the control elements, wherein the utilization shortens the time for storage preparation and at the same time avoids a release of fairly large activities.

With the foregoing and other objects in view there is provided, in accordance with the invention, in a method of packaging elongated components of control elements, in which spent absorber material is gas-tightly enclosed, in storage containers in a light-water-cooled nuclear reactor, the improvement which comprises winding up the elongated components into coils and packaging the coils in the storage containers.

In accordance with another mode of the invention, there is provided a method which comprises separating or cutting off a group of absorber fingers from head pieces of control elements of pressurized-water reactors, and performing the winding step by entirely winding the absorber fingers as the components.

In accordance with a further mode of the invention, there is provided a method which comprises separating a plurality of cruciformly attached absorber sheets of control elements of boiling-water reactors along their longitudinal axis, and performing the winding step by entirely winding the absorber sheets as the components.

In accordance with an added mode of the invention, there is provided a method which comprises maintaining the coils in the wound-up state with a retaining belt.

In accordance with an additional mode of the invention, there is provided a method which comprises performing the winding step by winding the coils between lateral jaws, and bending the lateral jaws around the wound control elements after winding for keeping the wound control elements in the wound-up state.

In accordance with yet another mode of the invention, there is provided a method which comprises performing the winding-up and packaging in a storage pond of the nuclear reactor.

In accordance with yet a further mode of the invention, there is provided a method which comprises performing the winding step by winding the components into coils having a hollow core, and packaging other parts of the control elements in the core.

With the objects of the invention in view, there is also provided, in a device for preparing an elongated component of a spent control element, containing gas-tightly enclosed absorber material, for storage in a storage container, the improvement comprising a gripping tool disposed at one side of the component and rotatable in a given direction, the gripping tool including a winding spindle for attachment of a free end of the component fed to the winding spindle in longitudinal direction of the component and displaceable in longitudinal direction of the winding spindle, the winding spindle disposed next to the component and approximately perpendicular to the longitudinal direction of the component, and the gripping tool including a rotary drive for driving the winding spindle; and a pressing and bending roller rotatable in a direction opposite to the given direction and disposed opposite the gripping tool on the other side of the component; the pressing and bending roller and the winding spindle spaced apart by a variable distance.

With the objects of the invention in view, there is additionally provided a light-water-cooled nuclear reactor, comprising a water pond; a storage container; and a device disposed in the water pond for preparing an elongated component of a spent control element, containing gas-tightly enclosed absorber material, for storage in the storage container.

With the objects of the invention in view, there is furthermore provided a coil, comprising an originally elongated component containing absorber material of a spent control element of a light-water-cooled nuclear reactor.

For this purpose, the components of the control elements containing spent absorber material as a rule are separated from their head pieces or cut off and wound up in their entirety into coils. In the case of cruciformly constructed control elements, which are composed of a plurality of absorber sheets, the absorber sheets are separated from one another along their longitudinal axis, for example through the use of severance cuts. The individual sheets which are thus produced are then wound up into coils.

In this procedure, the cladding tubes surrounding the activated absorber material do not need to be destroyed. It is therefore possible to avoid radioactive substances escaping from the gas-tight cladding tubes.

For this purpose, individual rods of control or absorber elements of pressurized-water reactors and individual absorber sheets of boiling-water reactors are fed to a winding device which operates under water.

The absorber fingers and absorber sheets are advantageously first separated from their head pieces and other structural elements before they are wound up into coils having the densest possible spiral winding by the winding device. In this connection, the winding device is constructed, for example, in such a way that the coils being produced have a hollow core. the coils can then be kept in the wound-up state by a suitable retention device. That can be achieved, for example, by placing a retaining belt around the coils immediately after winding them up.

Within the scope of the invention, the retention of the finished coils can be achieved by folding-in a winding coil surrounding the winding material.

The retained spiral-shaped, tightly wound coils can then be stacked in a basket having external dimensions which fit the standard shielded containers.

The remaining components of the control elements to be disposed of as waste, which generally contain no highly-activated substances, such as spider-shaped head pieces or structural elements, for example, can be compacted by cutting up and pressing and can be introduced into a still existing cavity in the center of the coils stacked in the basket. The stacking of the compacted components of control elements in a basket simplifies the subsequent handling in the shielded containers.

All of the steps in the method, such as cutting, winding-up and stacking can be performed, for example, in the fuel-element pond of the nuclear reactor.

The advantages of winding-up those elongated components of control elements which contain absorber material in the manner described above is that the winding material and the other compacted components can be densely packaged in standard shielded containers and thus enable an efficient space utilization, and that the compacting and packaging procedure requires less time in total than the heretofore standard cutting-up, sorting, pressing and packaging of all of the components.

Other features which are considered as characteristic for the invention are set forth in the appended claims.

Although the invention is illustrated and described herein as embodied in a method for packaging control and absorber elements of light-water reactors for waste disposal, a device for preparing an elongated component of a spent control element, a light-water-cooled reactor and a coil of an originally elongated component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
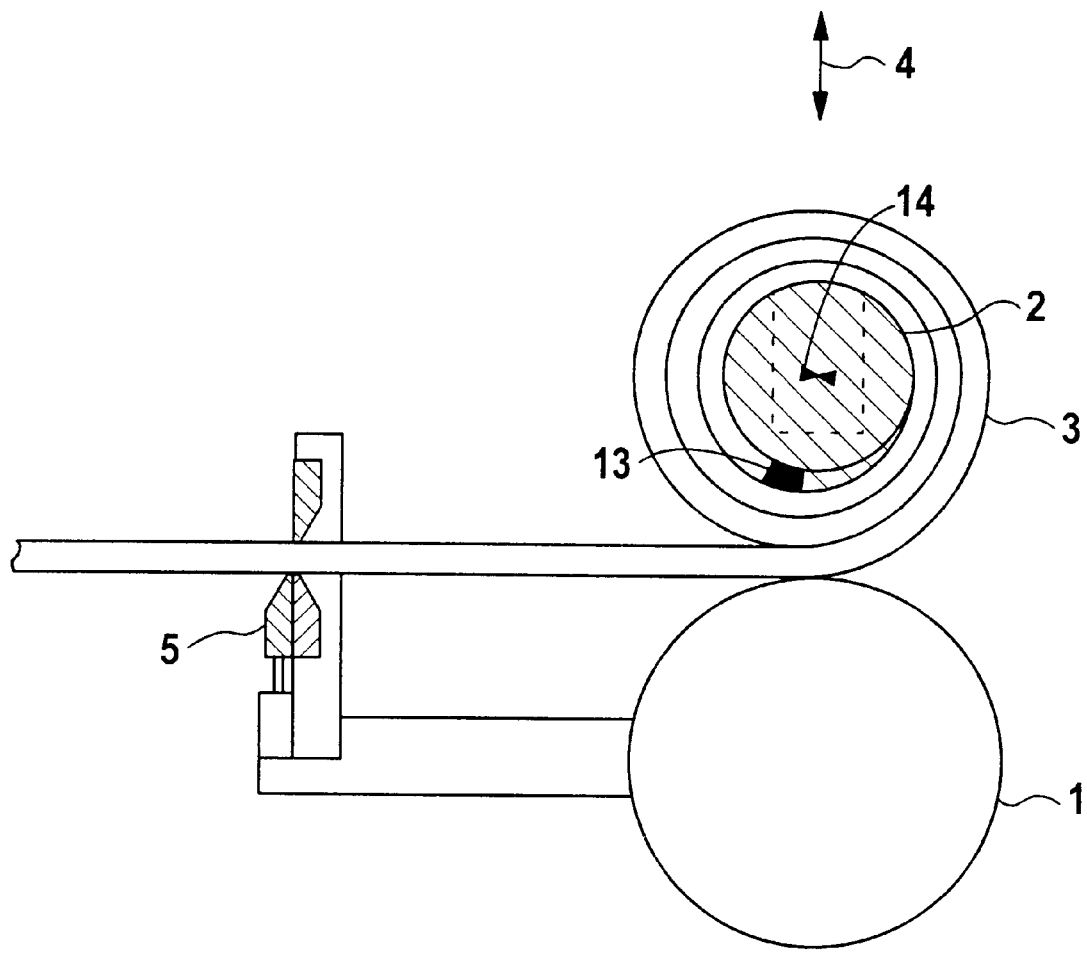
FIG. 1 is a fragmentary, diagrammatic, side-elevational view of a winding device for absorber fingers and for absorber sheets.

Referring now to the figures of the drawings in detail and first, particularly, to FIG. 1 thereof, there is seen a coil gripping device or tool 2 which is constructed to rotate about its center and on the periphery of which an absorber finger or an absorber sheet 3 can be wound up in spiral form. The sheet 3 is formed of elongated components of control elements in which spent absorber material is gas-tightly enclosed. For this purpose, a fixing device 13 is disposed on the outer periphery of the coil gripping device 2. A start of the absorber finger or of the absorber sheet 3 can be secured on the periphery of the coil gripping device 2 with the fixing device 13. A compact coil having a spiral winding is produced from the elongated absorber finger or absorber sheet or component 3 by rotation about a winding spindle 14 and winding-up.

The winding device has a bending roller 1 for pressing the absorber finger or the absorber sheet 3 against the outer periphery of the coil that is already wound up on to the coil gripping device 2. The result which this achieves is that the winding material fed to the coil makes firm contact with the outer periphery of the latter and as dense a winding as possible is produced.

The winding spindle 14 of the coil gripping device 2 can be moved along an axis in the direction of arrows 4, that is to say perpendicularly to the longitudinal axis of the winding material (which is the absorber finger or absorber sheet), in order to compensate for the constant increase in the circumference of the coil produced during the winding-up. The winding material is advantageously moved in turn in its longitudinal direction in accordance with the winding speed.

Once a predetermined, maximum circumference of the wound-up coil has been reached, an associated cutting tool 5 can separate the absorber finger or the absorber sheet 3 from the remaining coil. In this connection, advantageously only one mounting of the component on other parts of the control element is cut through in order to obtain the component as a gas-tight cladding of the absorber material. It is therefore also possible to determine the internal diameter which the coil should have for a given maximum circumference of the wound-up coil, i.e. the distance between the bending roller 1 and the winding spindle 14 at which the winding-up is started.

Figure 2:
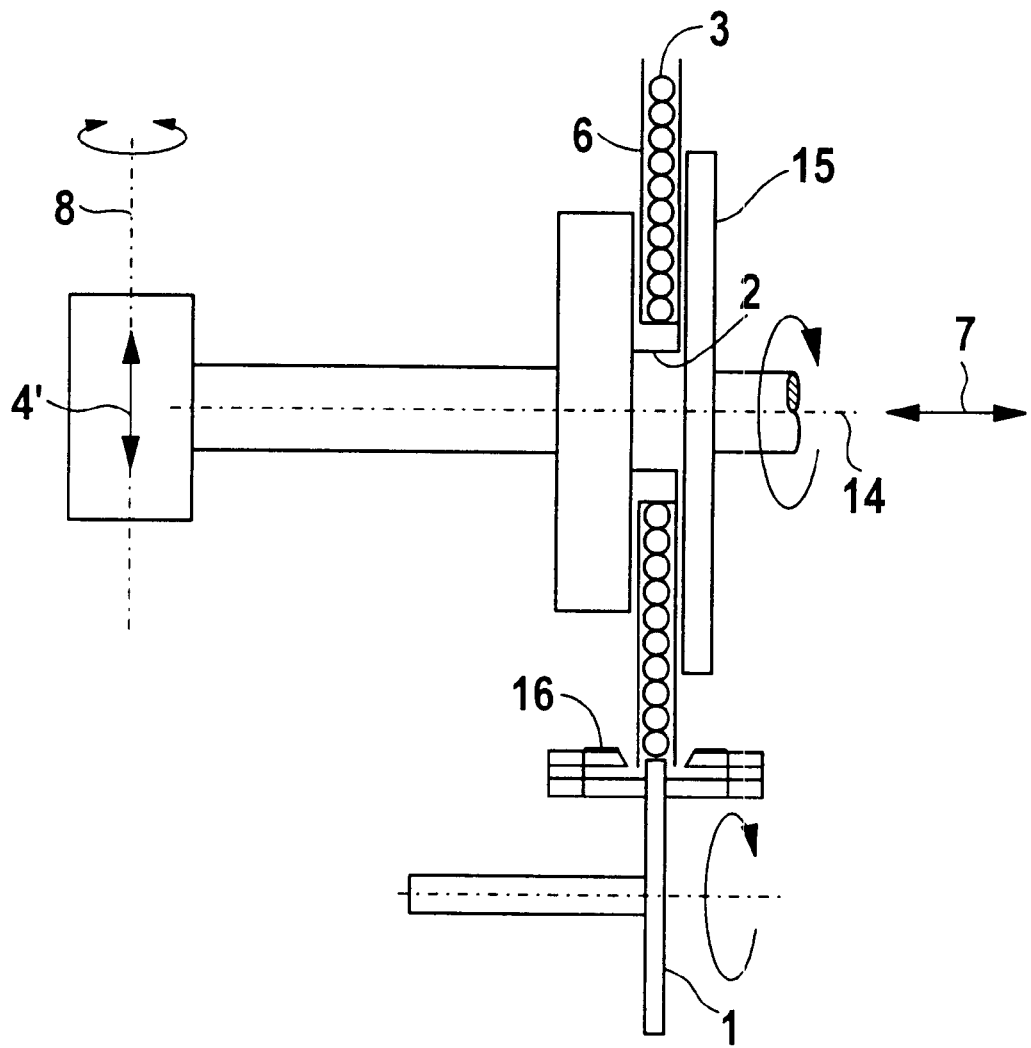
FIG. 2 is a sectional view through a winding device according to FIG. 1.

FIG. 2 shows a section of a winding device according to FIG. 1, in which elements having the identical function are denoted by identical reference symbols to those in FIG. 1.

The coil gripping device 2 is constructed with a suitable drive 4' so as to be rotatable about its winding spindle 14 and it has an associated support element 15 which fixes the coil produced on the coil gripping device 2 through the use of an associated winding coil 6 on the coil gripping device 2. The finished coil made of the absorber fingers or absorber sheets 3 can then be kept in the wound-up state by folding in lateral jaws of the winding coil 6 surrounding the coil with the aid of a folding element 16.

However, according to the invention, the finished coil may also be kept in the wound-up state by a retention belt.

In order to remove the coil, the coil gripping device 2 can be moved in the direction of arrows 7 along its winding spindle 14 in order to separate the coil gripping device 2 from the supporting element 15 and release the coil. The coil gripping device 2 can then perform a pivoting movement about a pivoting axis 8 and the retained coil can be pulled off the coil gripping device 2.

Figure 3:
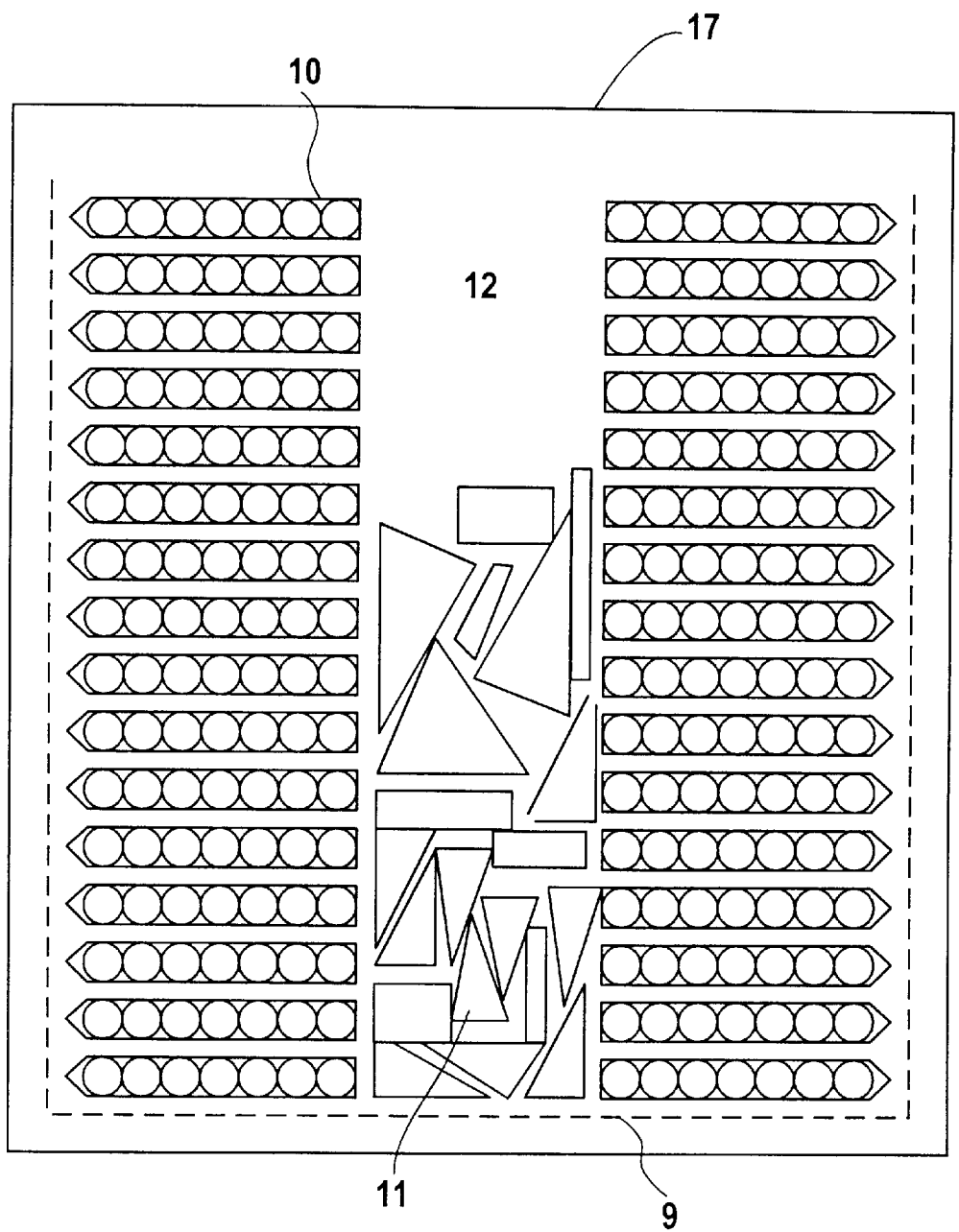
FIG. 3 is a sectional view through a basket containing coils made of absorber fingers and absorber sheets and compacted components in a coil center.

FIG. 3 shows a plurality of coils 10 which have been produced by a winding device and which are retained by folding in the lateral jaws of winding coils on which the absorber fingers are wound up. The coils are stacked in the interior of a basket 9 having external dimensions which fit into a standard shielded container 17. A hollow center 12 of the coils is densely filled with compacted residual material 11 of control elements in order to enable an efficient space utilization of the shielded container 17.

According to the invention, such a device can be disposed in a stationary or temporary manner in a water pond of a light-water-cooled nuclear reactor and can prepare elongated components originating from a spent control element of the nuclear reactor and containing gas-tightly enclosed absorber material, for storage in a storage container.

According to FIGS. 1 and 2, in particular, such a device has the rotational drive 4' for the winding spindle 14, which is disposed next to the component and approximately perpendicularly to the longitudinal direction of the component (absorber finger or absorber sheet) and which is part of a gripping tool that, for example, supports the coil gripping device 2 and to which a free end of the originally elongated component can be attached. The component can be moved relative to the gripping tool in its longitudinal direction, while the pressing and bending roller 1 is disposed on its other side and situated opposite the winding spindle of the gripping tool. The distance between the pressing and bending roller 1 and the winding spindle is variable to suit the thickness of the winding being produced.

In this way, coils are produced which are composed of an originally elongated component containing absorber material of a spent control element of a light-water-cooled nuclear reactor and which can be intermediately stored or finally stored in a space-saving manner in standard storage containers. In is therefore possible to avoid the escape of fairly large amounts of radioactive substances from the absorber material.

We claim:

1. In a method of packaging elongated components of control elements, in which spent absorber material is gas-tightly enclosed, in storage containers in a light-water-cooled nuclear reactor, the improvement which comprises:

winding up the elongated components into coils under water in a pond associated with the light-water-cooled nuclear reactor and packaging the coils in the storage containers.

2. The method according to claim 1, which comprises separating or cutting off a group of absorber fingers from head pieces of control elements of pressurized-water reactors, and performing the winding step by entirely winding the absorber fingers as the components.

3. The method according to claim 1, which comprises separating a plurality of cruciformly attached absorber sheets of control elements of boiling-water reactors along their longitudinal axis, and performing the winding step by entirely winding the absorber sheets as the components.

4. The method according to claim 1, which comprises maintaining the coils in the wound-up state with a retaining belt.

5. The method according to claim 1, which comprises performing the winding step by winding the coils between lateral jaws, and bending the lateral jaws around the wound control elements after winding for keeping the wound control elements in the wound-up state.

6. The method according to claim 1, which comprises performing the winding-up and packaging in a storage pond of the nuclear reactor.

7. The method according to claim 1, which comprises performing the winding step by winding the components into coils having a hollow core, and packaging other parts of the control elements in the core.

* * * * *